(12) United States Patent
Koyama

(10) Patent No.: US 11,318,715 B2
(45) Date of Patent: May 3, 2022

(54) HARD COATING FILM AND LAMINATE

(71) Applicant: Dai Nippon Printing Co., Ltd., Tokyo (JP)

(72) Inventor: Keisuke Koyama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 150 days.

(21) Appl. No.: 16/649,399

(22) PCT Filed: Sep. 27, 2018

(86) PCT No.: PCT/JP2018/035916
§ 371 (c)(1),
(2) Date: Aug. 17, 2020

(87) PCT Pub. No.: WO2019/065833
PCT Pub. Date: Apr. 4, 2019

(65) Prior Publication Data
US 2020/0376803 A1    Dec. 3, 2020

(30) Foreign Application Priority Data

Sep. 29, 2017   (JP) .............................. JP2017-190909

(51) Int. Cl.
*B32B 7/023*    (2019.01)
*B32B 7/12*     (2006.01)
(Continued)

(52) U.S. Cl.
CPC .............. *B32B 7/023* (2019.01); *B05D 3/068* (2013.01); *B32B 7/12* (2013.01); *B32B 27/08* (2013.01);
(Continued)

(58) Field of Classification Search
CPC .............. B32B 27/00–27/42; B32B 7/00–7/14
See application file for complete search history.

(56) References Cited

U.S. PATENT DOCUMENTS

2012/0099187 A1    4/2012   Meyer Zu Berstenhorst et al.
2017/0313911 A1*   11/2017  Fukuda ..................... B32B 7/12

FOREIGN PATENT DOCUMENTS

CN      107000419 A       8/2017
JP      04372668 A    *  12/1992
(Continued)

OTHER PUBLICATIONS

Machine translation of JP2010-099979. Retrieved Oct. 21, 2021.*
(Continued)

*Primary Examiner* — Prashant J Khatri
(74) *Attorney, Agent, or Firm* — Locke Lord LLP; James E. Armstrong, IV; Nicholas J. DiCeglie, Jr.

(57) ABSTRACT

The present disclosure provides a hard coat film comprising: a hard coat layer and a primer layer; wherein the primer layer includes a first layer of which transmittance with respect to light having a wavelength of 380 nm is 30% or below, and a second layer of which transmittance with respect to light having a wavelength of 340 nm is 10% or below; the first layer and the second layer are layered, in no particular order, in the position of one surface of the hard coat layer; and a substrate layer is included in the position of the surface of the hard coat layer which is opposite side surface to the primer layer side surface, or in the position of the surface of the primer layer which is opposite side surface to the hard coat layer side surface.

19 Claims, 3 Drawing Sheets

(51) Int. Cl.
*B32B 27/08* (2006.01)
*B32B 27/36* (2006.01)
*B05D 3/06* (2006.01)

(52) U.S. Cl.
CPC ........ *B32B 27/36* (2013.01); *B32B 2307/402* (2013.01)

(56) References Cited

FOREIGN PATENT DOCUMENTS

| JP | 2003-341294 A | | 12/2003 | |
|----|---------------|---|---------|---|
| JP | 2010-99979 A | | 5/2010 | |
| JP | 2013188880 A | * | 9/2013 | |
| JP | 2013-216774 A | | 10/2013 | |
| JP | 5651687 B2 | | 1/2015 | |
| WO | WO-2016072450 A1 | * | 5/2016 | ............. B29C 41/00 |

OTHER PUBLICATIONS

Machine translation of JP04-372668. Retrieved Oct. 21, 2021.*
Machine translation of JP2013-188880. Retrieved Oct. 21, 2021.*
International Search Report dated Jan. 8, 2019, issued for PCT/JP2018/05916.

* cited by examiner

HARD COATING FILM AND LAMINATE

TECHNICAL FIELD

The present disclosure is related to a hard coat film and a laminate using the hard coat film.

BACKGROUND ART

The hard coat film is a film including a hard coat layer, and is used in a way attaching the film to the surface of an article for purposes such as to protect the surface of the article, or to apply decoration to the surface.

One of the characteristics required for the hard coat film is weather (light) resistance. For example, Patent Document 1 discloses a structure of a transfer sheet wherein, on a supporting body sheet, as a transfer layer, a surface protecting layer (hard coat layer), a pattern layer, and an adhesive layer are sequentially layered; the surface protecting layer contains an ultraviolet absorbing agent, a light stabilizer, and an antioxidant; and each resin of the surface protecting layer, the pattern layer, and the adhesive layer is made of an acrylic resin. It is disclosed that, with the transfer sheet of Patent Document 1, since the ultraviolet absorbing agent, the light stabilizer, and the antioxidant are included in the surface protecting layer which becomes the head side of the transfer layer after transferring the transfer layer to an article, the weather (light) resistance in the transfer layer after the transfer may improve and be excellent.

Also, when the article is a colorless transparent resin base, photodegradation of the transparent resin base occurs more easily compared to a base made of an inorganic material. For that reason, in the hard coat film to be attached to the transparent resin base, in addition to the weather resistance of the hard coat film itself, improvement in weather resistance of the transparent resin base when attaching the hard coat film thereto, is also required. For example, Patent Document 2 discloses a multilayer product comprising the total of four layers: a scratch protecting layer and an ultraviolet protecting layer (two hard coat layers) containing an ultraviolet absorbing agent, and two layers of a polycarbonate layer, wherein absorbance of the scratch protecting layer and the ultraviolet protecting layer with respect to light having a wavelength of 340 nm is respectively in a specific range, so that photo yellowing of the polycarbonate layer may be inhibited.

CITATION LIST

Patent Documents

Patent Document 1: Japanese Patent Application Laid-Open (JP-A) No. 2003-341294
Patent Document 2: Japanese Patent (JP-B) No. 5651687

SUMMARY

Technical Problem

The inventor of the present disclosure has obtained a knowledge that, photodegradation of a coloring resin member caused by light ejected thereto interposing the hard coat layer cannot be sufficiently inhibited in the hard coat layer having conventional formula, when a resin member containing a coloring agent such as a decorative layer and a coloring resin base (hereinafter referred to as a coloring resin member) is included in the resin base side with respect to the hard coat layer in a laminate, in which the hard coat film is attached to the resin base.

The present disclosure has been made in view of the above circumstances, and provides a hard coat film with which the photodegradation of a coloring resin member included in a laminate can be inhibited when the hard coat film is attached to a resin base to form the laminate.

Solution to Problem

The present disclosure provides a hard coat film comprising: a hard coat layer, a primer layer, and a decorative layer in this order; wherein the primer layer includes a first layer of which transmittance with respect to light having a wavelength of 380 nm is 30% or below, and a second layer of which transmittance with respect to light having a wavelength of 340 nm is 10% or below; and the first layer and the second layer are layered, in no particular order, between the hard coat layer and the decorative layer; and a substrate layer is included in the position of the surface of the hard coat layer which is opposite side surface to the primer layer side surface, or in the position of the surface of the decorative layer which is opposite side surface to the primer layer side surface.

With the hard coat film of the present disclosure, when it is attached to a colorless or coloring resin base to form a laminate so as the decorative layer comes to the resin base side with respect to the hard coat layer, the first layer and the second layer configured in the primer layer are positioned between the hard coat layer and the decorative layer. Accordingly, among light ejected to the decorative layer from the hard coat layer side, light having a wavelength of around 380 nm contributing to the photodegradation of the coloring agent may be absorbed in the first layer in advance, and light having a wavelength of around 340 nm contributing to the photodegradation of the resin may be absorbed in the second layer in advance. As a result, in the laminate, light having these wavelengths would have difficulty reaching at coloring resin members such as the decorative layer and the coloring resin base; thus the photodegradation of the coloring resin members may be inhibited and the weather resistance of the laminate may be improved.

In the disclosure, in the primer layer, it is preferable that the second layer and the first layer are layered in this order from the hard coat layer side. With the above layering order, when the hard coat film of the present disclosure is attached to a resin base to form a laminate, the second layer and the first layer are positioned in this order from the hard coat layer side. Accordingly, light having a wavelength of around 340 nm may be absorbed in the second layer prior to the first layer, and thus the photodegradation of the first layer due to the light having the wavelength of around 340 nm, and the photodegradation of particularly the ultraviolet absorbing agent included in the first layer may be inhibited.

In the disclosure, it is preferable that the first layer contains an ultraviolet absorbing agent containing a benzophenone skeleton. The reason therefor is that it has high absorbing ability with respect to light having a wavelength of around 380 nm.

In the disclosure, the substrate layer may be included in the position of the surface of the hard coat layer which is opposite side surface to the primer layer side surface, an adhesive layer may be included in the position of the surface of the decorative layer which is opposite side surface to the primer layer side surface, and the adhesive layer may have heat sealing properties. The reason therefor is to allow the hard coat film of the present disclosure to be a hard coat film for transfer.

In the disclosure, the substrate layer may be included in the position of the surface of the decorative layer which is opposite side surface to the primer layer side surface, and the adhesive layer may be included in the position of the surface of the substrate layer which is opposite side surface to the decorative layer side surface. The reason therefor is to allow the hard coat film of the present disclosure to be a hard coat film for lamination.

The present disclosure also provides a hard coat film comprising: a hard coat layer and a primer layer; wherein the primer layer includes a first layer of which transmittance with respect to light having a wavelength of 380 nm is 30% or below, and a second layer of which transmittance with respect to light having a wavelength of 340 nm is 10% or below; the first layer and the second layer are layered, in no particular order, in the position of one surface of the hard coat layer; and a substrate layer is included in the position of the surface of the hard coat layer which is opposite side surface to the primer layer side surface, or in the position of the surface of the primer layer which is opposite side surface to the hard coat layer side surface.

With the hard coat film of the present disclosure, when it is attached to a colorless or coloring resin base, in which a coloring resin base and a decorative layer are arranged, to form a laminate so as the primer layer comes to the resin base side with respect to the hard coat layer, the first layer and the second layer configured in the primer layer are positioned between the hard coat layer and the coloring resin members such as the decorative layer and the coloring resin base. Accordingly, among light ejected to the coloring resin members from the hard coat layer side, light having a wavelength of around 380 nm contributing to the photodegradation of the coloring agent may be absorbed in the first layer in advance, and light having a wavelength of around 340 nm contributing to the photodegradation of the resin may be absorbed in the second layer in advance. As a result, in the laminate, light of these wavelengths would have difficulty reaching at the coloring resin members, and thus the photodegradation of the coloring resin members may be inhibited and the weather resistance of the laminate may be improved.

In the disclosure, in the primer layer, it is preferable that the second layer and the first layer are layered in this order from the hard coat layer side. With the above layering order, when the hard coat film of the present disclosure is attached to a resin base to form a laminate, the second layer and the first layer are positioned in this order from the hard coat layer side. Accordingly, light having a wavelength of around 340 nm may be absorbed in the second layer prior to the first layer, and thus the photodegradation of the first layer due to the light having the wavelength of around 340 nm, and the photodegradation of particularly the ultraviolet absorbing agent included in the first layer may be inhibited.

In the disclosure, it is preferable that the first layer contains an ultraviolet absorbing agent containing a benzophenone skeleton. The reason therefor is that it has high absorbing ability with respect to light having a wavelength of around 380 nm.

In the disclosure, the substrate layer may be included in the position of the surface of the hard coat layer which is opposite side surface to the primer layer side surface, an adhesive layer may be included in the position of the surface of the primer layer which is opposite side surface to the hard coat layer side surface, and the adhesive layer may have heat sealing properties. The reason therefor is to allow the hard coat film of the present disclosure to be a hard coat film for transfer.

In the disclosure, the substrate layer may be included in the position of the surface of the primer layer which is opposite side surface to the hard coat layer side surface, and an adhesive layer may be included in the position of the surface of the substrate which is opposite side surface to the primer layer side surface. The reason therefor is to allow the hard coat film of the present disclosure to be a hard coat film for lamination.

The present disclosure also provides a laminate comprising: a resin base, a decorative layer, a primer layer, and a hard coat layer in this order; wherein the primer layer includes a first layer of which transmittance with respect to light having a wavelength of 380 nm is 30% or below, and a second layer of which transmittance with respect to light having a wavelength of 340 nm is 10% or below; and the first layer and the second layer are layered, in no particular order, between the hard coat layer and the decorative layer.

In the present disclosure, the first layer and the second layer configured in the primer layer are positioned between the hard coat layer and the decorative layer, and thus, among light that enters to the decorative layer from the hard coat layer side, light having a wavelength of around 380 nm contributing to the photodegradation of the coloring agent may be absorbed in the first layer in advance, and light having a wavelength of around 340 nm contributing to the photodegradation of the resin may be absorbed in the second layer in advance. Thereby, light of these wavelengths would have difficulty reaching at the coloring resin members such as the decorative layer and the coloring resin base, and thus the photodegradation of the coloring resin members may be inhibited and the laminate may have high weather resistance.

In the disclosure, in the primer layer, it is preferable that the second layer and the first layer are layered in this order from the hard coat layer side. With the above layering order, light having a wavelength of around 340 nm may be absorbed in the second layer prior to the first layer, and thus the photodegradation of the first layer due to the light having the wavelength of around 340 nm, and the photodegradation of particularly the ultraviolet absorbing agent included in the first layer may be inhibited.

In the disclosure, it is preferable that the first layer contains an ultraviolet absorbing agent containing a benzophenone skeleton. The reason therefor is that it has high absorbing ability with respect to light having a wavelength of around 380 nm.

In the disclosure, an adhesive layer may be included between the decorative layer and the resin base. Also, in the case above, a substrate layer may be further included between the decorative layer and the adhesive layer.

The present disclosure also provides a laminate comprising: a coloring resin base, a primer layer, and a hard coat layer in this order; wherein the primer layer includes a first layer of which transmittance with respect to light having a wavelength of 380 nm is 30% or below, and a second layer of which transmittance with respect to light having a wavelength of 340 nm is 10% or below; and the first layer and the second layer are layered, in no particular order, between the hard coat layer and the coloring resin base.

In the present disclosure, the first layer and the second layer configured in the primer layer are positioned between the hard coat layer and the coloring resin base, and thus, among light that enters to the coloring resin base from the hard coat layer side, light having a wavelength of around 380 nm contributing to the photodegradation of the coloring agent may be absorbed in the first layer in advance, and light having a wavelength of around 340 nm contributing to the photodegradation of the resin may be absorbed in the second layer in advance. Thereby, light of these wavelengths would have difficulty reaching at the coloring resin base, and thus the photodegradation of the coloring resin base may be inhibited and the laminate may have high weather resistance.

In the disclosure, in the primer layer, it is preferable that the second layer and the first layer are layered in this order from the hard coat layer side. With the above layering order, light having a wavelength of around 340 nm may be absorbed in the second layer prior to the first layer, and thus the photodegradation of the first layer due to the light having the wavelength of around 340 nm, and the photodegradation of particularly the ultraviolet absorbing agent included in the first layer may be inhibited.

In the disclosure, it is preferable that the first layer contains an ultraviolet absorbing agent containing a benzophenone skeleton. The reason therefor is that it has high absorbing ability with respect to light having a wavelength of around 380 nm.

In the disclosure, an adhesive layer may be included between the primer layer and the coloring resin base. In this case, a substrate layer may be further included between the adhesive layer and the primer layer.

Advantageous Effects

The hard coat film of the present disclosure exhibits effects such that when it is attached to a resin base to form a laminate, photodegradation of coloring resin members included in the laminate may be inhibited.

DESCRIPTION OF EMBODIMENTS

Each of the hard coat film and the laminate of the present disclosure will be hereinafter described in details.

I. Hard Coat Film

The hard coat film of the present disclosure may be categorized into roughly four embodiments: the first and the second embodiments wherein a decorative layer is included, and the third and the forth embodiments wherein the decorative layer is not included. The hard coat film in each embodiment will be hereinafter respectively described.

A. Hard Coat Film in the First Embodiment

The hard coat film in this embodiment comprises a hard coat layer, a primer layer, and a decorative layer in this order; wherein the primer layer includes a first layer of which transmittance with respect to light having a wavelength of 380 nm is 30% or below, and a second layer of which transmittance with respect to light having a wavelength of 340 nm is 10% or below, wherein the first layer and the second layer are layered, in no particular order, between the hard coat layer and the decorative layer; and a substrate layer is included in the position of the surface of the hard coat layer which is opposite side surface to the primer layer side surface.

Figure 1:
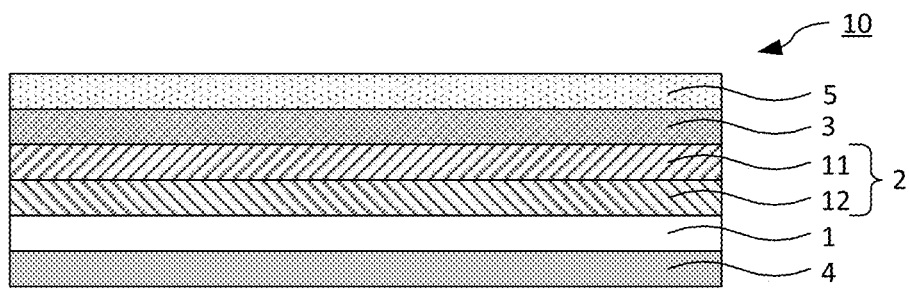
FIG. 1 is a schematic cross-sectional view illustrating an example of a hard coat film in the first embodiment of the present disclosure.

FIG. 1 is a schematic cross-sectional view illustrating an example of the hard coat film in this embodiment. Hard coat film 10 in this embodiment comprises hard coat layer 1, primer layer 2, and decorative layer 3, in this order. The primer layer 2 includes first layer 11 of which transmittance with respect to light having a wavelength of 380 nm is a certain value or below, and second layer 12 of which transmittance with respect to light having a wavelength of 340 nm is a specified value or below, and the first layer 11 and the second layer 12 are layered, in no particular order, between the hard coat layer 1 and the decorative layer 3. In the hard coat film 10 of this embodiment illustrated in FIG. 1, in the primer layer 2, the second layer 12 and the first layer 11 are layered in this order from the hard coat layer 1 side. Also, the hard coat film 10 of this embodiment includes substrate layer 4 on the surface of the hard coat layer 1 which is opposite side surface to the primer layer 2 side surface ("on" here is expressed as "in the position of" in the claim which includes a case an additional layer is interposed therebetween; hereinafter the same is true).

The hard coat film of this embodiment has an adhesive function in the outermost surface which is the opposite side to the substrate layer, and thus it may be used as a hard coat film for transfer, of which structures other than the substrate layer may be transferred to an article. For example, as illustrated in FIG. 1, the hard coat film 10 of this embodiment includes, adhesive layer (heat sealing layer) 5 having heat sealing properties, on the surface of the decorative layer 3 which is the opposite side surface to the primer layer 2 side surface; thus, the hard coat film of this embodiment excluding the substrate layer may be transferred and attached to an article interposing the adhesive layer. Also, the hard coat film 10 of this embodiment may be an embodiment in which the decorative layer 3 has a function for adhering to an article and thus it may be transferred and attached to an article without further arranging the adhesive layer 5.

Figure 2:
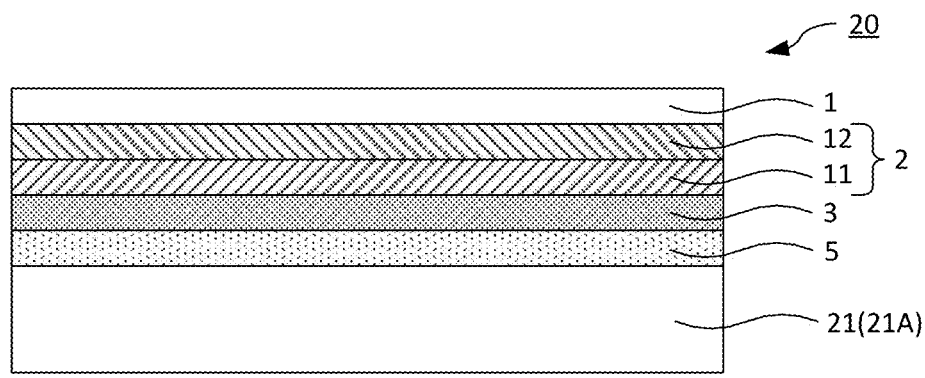
FIG. 2 is a schematic cross-sectional view illustrating an example of a laminate in the first embodiment of the present disclosure.

FIG. 2 is a schematic cross-sectional view illustrating an example of a laminate obtained by transferring and attaching the hard coat film of this embodiment to a resin base. Laminate 20 illustrated in FIG. 2 comprises resin base 21, decorative layer 3, primer layer 2, and hard coat layer 1, in this order. The primer layer 2 includes first layer 11 of which transmittance with respect to light having a wavelength of 380 nm is a specified value or below, and second layer 12 of which transmittance with respect to light having a wavelength of 340 nm is a specified value or below, and the first layer 11 and the second layer 12 are layered, in no particular order, between the hard coat layer 1 and the decorative layer 3. In the laminate 20 illustrated in FIG. 2, in the primer layer 2, the second layer 12 and the first layer 11 are layered in this order form the hard coat layer 1 side. Also, in FIG. 2, adhesive layer (heat sealing layer) 5 is included between the decorative layer 3 and the resin base 21. Incidentally, FIG. 2 shows an example in which the resin base 21 is transparent resin base 21A, but it may be a coloring resin base containing a coloring agent.

Figure 3:
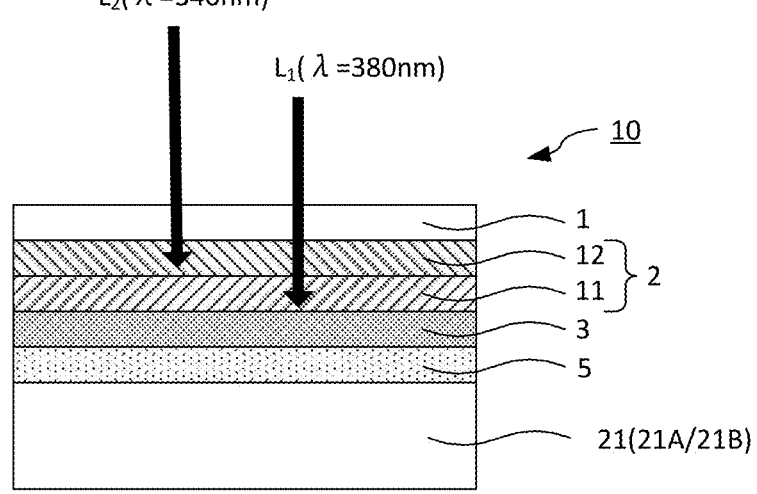
FIG. 3 is a schematic diagram explaining the functions of the first layer and the second layer configured in the primer layer.

With the hard coat film of this embodiment, as shown in FIG. 3, when it is attached to colorless or coloring resin base 21 to form the laminate 20 so as the decorative layer 3 comes to the resin base 21 side with respect to the hard coat layer 1, the first layer 11 and the second layer 12 configured in the primer layer 2 are positioned between the hard coat layer 1 and the decorative layer 3. Accordingly, among light that enters to the decorative layer 3 from the hard coat layer 1 side, light $L_1$ ($\lambda$=380 nm) having a wavelength of around 380 nm contributing to the photodegradation of the coloring agent may be absorbed in the first layer 11 in advance. Thereby, in the laminate 20, it is possible to inhibit the photodegradation of a coloring agent included in coloring resin members such as the decorative layer 3 and the coloring resin base 21B positioned on a side of the first layer 11 which is opposite side to from where light enters. Also, among light that enters to the decorative layer 3, light $L_2$ ($\lambda$=340 nm) having a wavelength of around 340 nm contributing to the photodegradation of the resin may be absorbed in the second layer 12 in advance. Thereby, in the laminate 20, it is possible to inhibit the photodegradation of the resin included in the coloring resin members positioned on a side of the second layer 12 which is opposite side to from where light enters.

In this manner, with the hard coat film of this embodiment, when it is attached to a resin base to form a laminate, the photodegradation of the coloring resin members included in the laminate may be inhibited, and thus weather resistance of the laminate may be improved.

Each constitution of the hard coat film in this embodiment will be hereinafter described.

1. Primer Layer

The primer layer in the hard coat film of this embodiment is a layer positioned between the hard coat layer and the decorative layer, and includes the first layer of which transmittance with respect to light having a wavelength of 380 nm is a specified value or below, and the second layer of which transmittance with respect to light having a wavelength of 340 nm is a specified value or below. The first layer and the second layer configured in the primer layer are layered, in no particular order, between the hard coat layer and the decorative layer.

The primer layer includes the first layer and the second layer having specified wavelength absorbing properties, and thus each of the first layer and the second layer may exhibit the function of absorbing light having specific wavelength region, the regions to be absorbed are different in the first layer and in the second layer. Here, when the primer layer is made of a single layer to exhibit the function of absorbing lights in different and specific wavelength regions at the same time, the amount of the ultraviolet absorbing agent that can be included in the single layer would be limited, and it may be difficult to sufficiently exhibit the aforementioned function in some cases. To solve the problem, the primer layer is configured by two layers which respectively have different wavelength absorbing properties to allow each layer to include an appropriate amount of the ultraviolet absorbing agent which is respectively appropriate to exhibit the specified wavelength absorbing properties, and thus it is possible for each layer to sufficiently absorb the light in specific wavelength regions.

The primer layer has general functions as a primer layer such as a function as a stress relaxation layer for the hard coat layer and a function of improving the cohesiveness of the hard coat layer, in addition to the above described functions of each of the first layer and the second layer.

(1) First Layer

The transmittance of the first layer in the primer layer with respect to light having a wavelength of 380 nm is 30% or below. The first layer is to be positioned in a light entering side with respect to the decorative layer and the coloring resin base in the laminate which is obtained by attaching the hard coat film of this embodiment to a resin base. Then, among light that enters to the laminate, light having a wavelength of around 380 nm contributing to photodegradation of the coloring agent is absorbed in the first layer having the above described wavelength absorbing properties. As a result, in the laminate, it is possible to inhibit photodegradation of the coloring agent included in the coloring resin member positioned in a side of the first layer which is opposite side to the side from where light enters.

(a) Wavelength Absorbing Properties

The transmittance of the first layer with respect to light having a wavelength of 380 nm may be 30% or below, is preferably 20% or below, and more preferably 15% or below. The reason therefor is that the first layer may absorb the light contributing to the photodegradation of the coloring agent sufficiently when the transmittance of the first layer with respect to light having a wavelength of 380 nm is in the above range.

Also, the transmittance of the first layer with respect to light having a wavelength of 340 nm is not particularly limited but is preferably low. Also, the transmittance of the first layer with respect to light having a wavelength of 340 nm may be higher than the transmittance of the second layer with respect to light having a wavelength of 340 nm. The transmittance of the first layer with respect to light having a wavelength of 340 nm is, for example, preferably 5% or above and 20% or below, and in that range, 5% or above and 15% or below, particularly 5% or above and 10% or below is preferable. The reason therefor is that the first layer may also absorb light having a wavelength of around 340 nm contributing to photodegradation of a resin when the transmittance of the first layer with respect to light having a wavelength of 340 nm is in the above described range.

In the present specification, light transmittance may be a value at each wavelength in the spectrum of a spectral transmission measured in a range of wavelength 300 nm or above and 800 nm or below using an ultraviolet visible spectrophotometer (such as V-7100 from JASCO Corporation). Also, as a method for calculating the light transmittance of the first layer from the hard coat film of the present disclosure, for example, a method below may be used. For example, when the first layer and the second layer in the primer layer are layered in the order of the first layer and the second layer from the hard coat layer side, first, a coloring member such as the decorative layer included in the hard coat film is removed by means such as grinding, to forma multilayer in which the substrate layer, the hard coat layer, the first layer, and the second layer are layered in this order. Then, the light transmittance of the multilayer is measured with the above described method, and the thickness of each layer in the multilayer is measured from a SEM observation on the cross-section of the multilayer. Next, the thickness of the second layer measured is removed from the multilayer by grinding, and the light transmittance of the multilayer after removing the second layer is measured with the above described method. Sequentially, the thickness of the first layer measured is grinded to be removed from the multilayer of which the second layer is already removed, and the light transmittance of the multilayer after removing the first layer is measured with the above described method. Then, the light transmittance of the first layer alone may be calculated from the difference between the light transmittance of the multilayer after removing the second layer (before removing the first layer) and the light transmittance of the multilayer after removing the first layer. The light transmittance of the first layer alone may be calculated from the difference between the light transmittances before and after removing the first layer in the same manner also when the first layer and the second layer in the primer layer are layered in the order of the second layer and the first layer from the hard coat layer side. The light transmittance may be measured and calculated in the same manner also for the hard coat film in each of the second to the fourth embodiment described later.

(b) Materials

The first layer contains at least a resin and an ultraviolet absorbing agent component. Incidentally, the ultraviolet absorbing agent component in the first layer is a general term for the ultraviolet absorbing agent included in the first layer.

(i) Ultraviolet Absorbing Agent Component

The ultraviolet absorbing agent component in the first layer contains an ultraviolet absorbing agent that allows the first layer to have the above described wavelength absorbing properties. There is no limitation on the ultraviolet absorbing agent, and if the one shows absorbing properties with respect to ultraviolet ray having a wavelength of 380 nm, it may be used. For example, it may be at least one kind selected from the group consisting of an ultraviolet absorbing agent containing a benzophenone skeleton (that is, a benzophenone-based ultraviolet absorbing agent), an ultraviolet absorbing agent containing a triazine skeleton (that is, a triazine-based ultraviolet absorbing agent), and an ultraviolet absorbing agent containing a benzotriazole skeleton (that is, a benzotriazole-based ultraviolet absorbing agent). Among them, the benzophenone-based ultraviolet absorbing agent is preferable. The reason therefor is because the light having a wavelength of around 380 nm may be sufficiently absorbed therewith since most of the compounds categorized into the benzophenone-based ultraviolet absorbing agent have high absorbing ability with respect to ultraviolet having a wavelength of around 380 nm among ultraviolet regions.

There is no particular limitation on the benzophenone-based ultraviolet absorbing agent if it contains a benzophenone skeleton, and examples thereof may include 2,2',4,4'-tetrahydroxybenzophenone, 2-hydroxybenzophenone, 4-hydroxybenzophenone, 2-hydroxy-4-methoxybenzophenone, 2-hydroxy-4-octyloxybenzophenone, 2,4-dihydroxybenzophenone, 2-hydroxy-4-methoxy-4'-chlorobenzophenone, 2,2'-dihydroxy-4-methoxybenzophenone, 2,2'-dihydroxy-4,4'-dimethoxybenzophenone, 2,4-dihydroxy-4-methoxy-5-sulfobenzophenone, and 2-hydroxy-4-methoxybenzophenone-5-sulfonic acid hydride. The benzophenone-based ultraviolet absorbing agent may be one kind solely and may be two kinds or more of the above. Among the above benzophenone-based ultraviolet absorbing agents, 2,2',4,4'-tetrahydroxybenzophenone is preferable from the viewpoint of solubility.

Also, examples of the triazine-based ultraviolet absorbing agent that shows absorbing ability with respect to ultraviolet having a wavelength of 380 nm may include 2,4,6-tri(2-hydroxy-4-hexyloxy-3-methylphenyl)-1,3,5-triazine.

The ultraviolet absorbing agent component in the first layer may solely contain at least one kind of the ultraviolet absorbing agent selected from the group consisting of a benzophenone-based ultraviolet absorbing agent, a triazine-based ultraviolet absorbing agent, and a benzotriazole-based ultraviolet absorbing agent (which may be hereinafter referred to as simply "the aforementioned group" in some cases), and may contain an ultraviolet absorbing agent other than the ultraviolet absorbing agents included in the aforementioned group (which will be hereinafter referred to as an ultraviolet absorbing agent other than the aforementioned group), in addition to the ultraviolet absorbing agents included in the aforementioned group, if the first layer can have the above described wavelength absorbing properties therewith. Examples of the ultraviolet absorbing agent other than the aforementioned group may include ultraviolet absorbing agents included in publicly known primer layers.

When the ultraviolet absorbing agent component contains the ultraviolet absorbing agent included in the aforementioned group and an ultraviolet absorbing agent other than the aforementioned group, the content of the ultraviolet absorbing agent included in the aforementioned group that occupies the ultraviolet absorbing agent component in the first layer is not particularly specified if the content allows the first layer to have the above described wavelength absorbing properties; for example, the total proportion of the ultraviolet absorbing agent included in the aforementioned group that occupies the ultraviolet absorbing agent component (100 mass %) is preferably 20 mass % or above, and above all, preferably 50 mass % or above. Also, the total proportion of the ultraviolet absorbing agent included in the aforementioned group that occupies the ultraviolet absorbing agent component (100 mass %) in the first layer may be 100 mass %. It means that the ultraviolet absorbing agent component in the first layer may contain at least one kind selected from the aforementioned group solely.

Above all, the ultraviolet absorbing agent component in the first layer preferably contains a benzophenone-based ultraviolet absorbing agent. In other words, the first layer preferably contains the benzophenone-based ultraviolet absorbing agent. When the ultraviolet absorbing agent component contains the benzophenone-based ultraviolet absorbing agent, the proportion of the benzophenone-based ultraviolet absorbing agent that occupies the ultraviolet absorbing agent component (total amount: 100 mass %) may be in the same range as that for the content of the ultraviolet absorbing agent included in the aforementioned group that occupies the ultraviolet absorbing agent component described above. Also, the proportion of the benzophenone-based ultraviolet absorbing agent that occupies the ultraviolet absorbing agent component (total amount: 100 mass %) in the first layer may be 100 mass %. It means that the ultraviolet absorbing agent component in the first layer may contain the benzophenone-based ultraviolet absorbing agent solely.

The content of the ultraviolet absorbing agent component in the first layer may be an amount that allows the first layer to have the above described wavelength absorbing properties; for example, in the total solid component 100 mass % of the first layer, the content is preferably 3 mass % or above and 15 mass % or below, and in that range, 3 mass % or above and 10 mass % or below, particularly 3 mass % or above and 7 mass % or below is preferable. When the content of the ultraviolet absorbing agent component in the first layer is too much compared to the aforementioned range, the ultraviolet absorbing agent may bleed-out from the first layer and the properties may not be maintained in some cases, and on the other hand, when the content is too little compared to the aforementioned range, the light having a wavelength of around 380 nm may not be sufficiently absorbed in the first layer, and the degradation of the coloring resin member may not be sufficiently inhibited in some cases.

(ii) Resin

There is no particular limitation on the resin included in the first layer; it may be a resin cured product, and may be a thermoplastic resin.

The resin cured product may be a cured product of a resin component including a main agent and a curing agent. Examples of the main agent may include a polyurethane resin, a (meth)acryl resin product, a vinylchloride-vinylacetate copolymer, a polyester resin, a butyral resin, chlorinated polypropylene, and chlorinated polyethylene. One kind of these agents may be solely included, and two kinds or more thereof may be included.

Also, examples of the curing agent may include an isocyanate curing agent such as tolylene diisocyanate, diphenyl methane diisocyanate, hexamethylene diisocyanate, xylylene diisocyanate, cyclohexane phenylene diisocyanate, and naphthalene-1,5-diisocyanate. One kind of these may be solely included, and two kinds or more thereof may be included.

On the other hand, examples of the thermoplastic resin may include an acryl resin, a vinylchloride-vinylacetate copolymer, a polyamide resin, a polyester resin, chlorinated polypropylene, a chlorinated rubber, a urethane resin, an epoxy resin, and a styrene resin. One kind of these may be solely included, and two kinds or more thereof may be included.

When the first layer is positioned in the hard coat layer side with respect to the second layer, the resin included in the first layer is preferably a resin cured product. Above all, the main agent is preferably a polyurethane resin, and it is more preferable that the main agent is a polyurethane resin further containing an acryl skeleton in its polymer chain.

Examples of the urethane resin containing an acryl skeleton in its polymer chain may include a urethane-acryl copolymer that is a copolymer of a urethane component and an acryl component, and an acryl resin including a hydroxyl group or an isocyanate group as a polyol component or a polyisocyanate component that configures polyurethane. Among them, the urethane-acryl copolymer is preferable.

Among the aforementioned polyurethane resins containing an acryl skeleton in its polymer chain, a polyurethane resin further containing a polycarbonate skeleton or a polyester skeleton in its polymer chain is preferable from the viewpoint of cohesiveness with the hard coat layer. For example, the polyurethane containing an acryl skeleton and further containing a polycarbonate skeleton or a polyester skeleton in its polymer chain may be a polycarbonate-based urethane-acryl copolymer that is a copolymer of a polycarbonate-based urethane component and an acryl component, or a polyester-based urethane-acryl copolymer that is a copolymer of a polyester-based urethane component and an acryl component. Among them, the polycarbonate-based urethane-acryl copolymer is particularly preferably used for the reasons such as to provide further more excellent weather resistance and to further improve cohesiveness with the hard coat layer.

(iii) Additives

The first layer may contain an additive agent as required, other than the ultraviolet absorbing agent component and the resin. Examples of the additive agent may include a light stabilizer such as HALS, an abrasion resistance improving agent, an infrared absorbent, a light stabilizer, an antistatic agent, an adhesiveness improving agent, a leveling agent, a thixotropy imparting agent, a coupling agent, a plasticizer, an antifoaming agent, a filler, a solvent, and a coloring agent. These additives to be used may be selected appropriately from those commonly used. The content of the additive in the first layer may be appropriately determined in an amount as to the extent with which the wavelength absorbing properties of the first layer are not deteriorated.

(c) Others

The first layer may have a thickness with which the first layer can have the above described wavelength absorbing properties. There is no particular limitation on the thickness of the first layer; for example, it may be 1 µm or above and 50 µm or below, preferably 1 µm or above and 10 µm or below, and more preferably 1 µm or above and 5 µm or below.

(2) Second Layer

The transmittance of the second layer in the primer layer with respect to light having a wavelength of 340 nm is 10% or below. The second layer is to be positioned in a light entering side with respect to the decorative layer and the coloring resin base in the laminate which is obtained by attaching the hard coat film of this embodiment to a resin base. Then, among lights enter to the laminate, light having a wavelength of around 340 nm contributing to photodegradation of the resin is absorbed in the second layer having the above described wavelength absorbing properties. As a result, in the laminate, it is possible to inhibit photodegradation of the resin included in the coloring resin member positioned in the resin base side with respect to the second layer. Also, in the laminate, it is possible to inhibit photodegradation of the resin included in the colorless resin member positioned in the resin base side with respect to the second layer.

(a) Wavelength Absorbing Properties

The transmittance of the second layer with respect to light having a wavelength of 340 nm may be 10% or below, is preferably 5% or below, and more preferably 1% or below. The transmittance of the second layer with respect to light having a wavelength of 340 nm may further be 0.5% or below, and may be 0.1% or below. The reason therefor is that the second layer may absorb the light contributing to the photodegradation of the resin sufficiently when the transmittance of the second layer with respect to light having a wavelength of 340 nm is in the above range.

Also, the transmittance of the second layer with respect to light having a wavelength of 380 nm is not particularly limited but is preferably low. Also, the transmittance of the second layer with respect to light having a wavelength of 380 nm may be higher than the transmittance of the first layer with respect to light having a wavelength of 380 nm. The transmittance of the second layer with respect to light having a wavelength of 380 nm is, for example, preferably over 30% and 70% or below, and in that range, preferably over 30% and 60% or below, and particularly preferably over 30% and 50% or below. Also, the transmittance of the second layer with respect to light having a wavelength of 380 nm is preferably over 30%, but may be 40% or above, and may be 45% or above.

The method for calculating the light transmittance of the second layer from the hard coat film of the present disclosure may be the same as the method for calculating the light transmittance of the first layer from the hard coat film of the present disclosure, and the light transmittance of the second layer solely may be calculated from the difference of the light transmittances before and after removing the second layer in the hard coat film of which the decorative layer is already removed.

(b) Materials

The second layer contains at least an ultraviolet absorbing agent component and a resin. Incidentally, the ultraviolet absorbing agent component in the second layer is a general term for the ultraviolet absorbing agent included in the second layer.

(i) Ultraviolet Absorbing Agent Component

The ultraviolet absorbing agent component in the second layer contains an ultraviolet absorbing agent with which the second layer can have the above described wavelength absorbing properties. There is no limitation on the ultraviolet absorbing agent, and if the one shows absorbing ability with respect to ultraviolet ray having a wavelength of 340 nm, it may be used, and it may be an inorganic ultraviolet absorbing agent and may be an organic ultraviolet absorbing agent. Also, the ultraviolet absorbing agent component may contain just the inorganic ultraviolet absorbing agent, may contain just the organic ultraviolet absorbing agent, and may contain the both.

Examples of the inorganic ultraviolet absorbing agent may include titanium dioxide, cerium oxide, and zinc oxide. One kind of these may be included solely, and two kinds or more thereof may be included.

Also, examples of the organic ultraviolet absorbing agent may include a benzotriazole-based ultraviolet absorbing agent, a triazine-based ultraviolet absorbing agent, a benzoxazine-based ultraviolet absorbing agent, a cyanoacrylate-based ultraviolet absorbing agent, and a salicylic acid-based ultraviolet absorbing agent. One kind of these may be included solely, and two kinds or more thereof may be included.

Among the above, the ultraviolet absorbing agent component in the second layer preferably contains the benzotriazole-based ultraviolet absorbing agent. In other words, the second layer preferably contains the benzotriazole-based ultraviolet absorbing agent. The reason therefor is because the benzotriazole-based ultraviolet absorbing agent can show absorbing ability with respect to the ultraviolet ray having a wavelength of 340 nm, and the durability of itself is excellent; thus, it may exhibit the function of absorbing the ultraviolet ray having a wavelength of 340 nm for a long period of time.

Incidentally, it is preferable that the second layer does not contain a benzophenone-based ultraviolet absorbing agent. The second layer does not contain the benzophenone-based ultraviolet absorbing agent means that the proportion of the benzophenone-based ultraviolet absorbing agent that occupies the ultraviolet absorbing agent component (total amount: 100 mass %) in the second layer is 15 mass % or below, and above all, preferably 10 mass % or below, and may be 0 mass %.

The content of the ultraviolet absorbing agent component in the second layer may be an amount that allows the second layer to have the above described wavelength absorbing properties; for example, in the total solid component 100 mass % of the second layer, the content is preferably 10 mass % or above and 30 mass % or below, and in that range, 15 mass % or above and 30 mass % or below, particularly 20 mass % or above and 30 mass % or below is preferable. When the content of the ultraviolet absorbing agent component in the second layer is too much compared to the aforementioned range, the ultraviolet absorbing agent may bleed-out from the second layer to cause a blocking in some cases when the hard coat film of the present disclosure is kept as a roll, and to degrade functions due to the ultraviolet absorbing agent in some cases. On the other hand, when the content of the ultraviolet absorbing agent component in the second layer is too little compared to the aforementioned range, sufficient ultraviolet absorbing properties may not be obtained to give weather resistance in some cases.

(ii) Resin

The resin included in the second layer may be the same as the resin described in the section "(b) Materials (ii) Resin" in "(1) First layer" above; thus, the descriptions herein are omitted.

(iii) Additive

The second layer may contain the additive exemplified in the section "(b) Materials (iii) Additive" in "(1) First layer" above, as required other than the ultraviolet absorbing agent component and the resin. The content of the additive in the second layer may be appropriately determined in an amount as to the extent with which the wavelength absorbing properties of the second layer are not deteriorated.

(c) Others

The second layer may have a thickness with which the second layer can have the above described wavelength absorbing properties. There is no particular limitation on the thickness of the second layer; for example, it may be 1 μm or above and 50 μm or below, preferably 1 μm or above and 10 μm or below, and more preferably 1 μm or above and 5 μm or below.

(3) Others

In the primer layer, the first layer and the second layer are, in no particular order, layered between the hard coat layer and the decorative layer. The first layer and the second layer may be layered in the order of the second layer and the first layer from the hard coat layer side, and may be layered in the order of the first layer and the second layer from the hard coat layer side. Among them, for the below reason, in the primer layer, it is preferable that the second layer and the first layer are layered in this order from the hard coat layer side. The reason therefor is that ultraviolet absorbing agents tend to be inferior in weather resistance with respect to light in a short wavelength region; among the ultraviolet absorbing agents, the benzophenone-based ultraviolet absorbing agent suitable as the ultraviolet absorbing agent to be included in the first layer tends to be inferior in the weather resistance with respect to the light in a short wavelength region compared to the other ultraviolet absorbing agents. Accordingly, if the first layer and the second layer are layered in this order from the hard coat layer side, when the hard coat film of this embodiment is attached to a resin base to form a laminate, the second layer would be positioned in the light entering side of the laminate with respect to the first layer, and thus the light having a wavelength that contributes to photodegradation of the benzophenone-based ultraviolet absorbing agent may be absorbed in the second layer in advance. Thereby, the photodegradation of the first layer may be inhibited.

The first layer and the second layer may be layered, in no particular order, between the hard coat layer and the decorative layer. The first layer and the second layer may directly contact each other, and an additional layer other than the hard coat layer and the decorative layer may be disposed between the first layer and the second layer.

The transmittance of the primer layer as a whole including the first layer and the second layer with respect to each of light having wavelength of 380 nm and wavelength of 340 nm is not particularly limited if the first layer and the second layer respectively have the above described wavelength absorbing properties. The transmittance of the primer layer as a whole with respect to light having a wavelength of 380 nm may be, for example, 20% or below, and preferably 15% or below. Also, the transmittance of the primer layer as a whole with respect to light having a wavelength of 340 nm may be, for example, 5% or below, and preferably 3% or below. Incidentally, the lower limit of the transmittance of the primer layer as a whole with respect to each of light having wavelength of 380 nm and wavelength of 340 nm may be adjusted by controlling factors such as the addition amount and the membrane thickness of the ultraviolet absorbing agent included in each of the first layer and the second layer. The method for calculating the light transmittance of the primer layer as a whole from the hard coat film of the present disclosure may be the same as the method for calculating the light transmittance of the first layer from the hard coat film of the present disclosure, and it may be calculated from the difference between the light transmittance before removing the first layer and the second layer, and the light transmittance after removing the first layer and the second layer, in the hard coat film of which the decorative layer is already removed.

2. Hard Coat Layer

The hard coat layer in the hard coat film of this embodiment is a layer positioned on the primer layer which is opposite side to the decorative layer side. The hard coat layer is a layer that comes to the outermost of a laminate obtained by attaching the hard coat film of this embodiment to a resin base, and a layer having a function of giving scratch resistance properties.

Examples of a material that configures the hard coat layer may include a resin cured product. There is no particular limitation on the resin cured product, and it may be a cured product of a resin included in general hard coat layers. Examples of the resin cured product may include the cured product of resins such as a polyester resin, an epoxy resin, a polyurethane resin, an amino alkyd resin, a melamine resin, a guanamine resin, a urea resin, and an acryl resin. The resin cured product may be a cured product such that a thermosetting resin is heated and cured, and may be a cured product such that an ionizing radiation-curable resin is cured by photoirradiation.

The hard coat layer may appropriately contain a thermoplastic resin for adding properties such as flexibility and other properties. Also, the hard coat layer may contain various additives to the extent so as not to interfere its properties. Examples of the various additives may include anti-scratch particles, an ultraviolet absorbing agent, a light stabilizer, a photopolymerization initiator, a polymerization inhibitor, a crosslinking agent, an antistatic agent, an adhesiveness improving agent, an antioxidant, a leveling agent, a thixotropy imparting agent, a coupling agent, a plasticizer, an antifoaming agent, a filler, and a solvent.

There is no particular limitation on the thickness of the hard coat layer, and it may be appropriately determined so as to exhibit the function as the hard coat layer. The thickness may be, for example, 1 µm or above and 20 µm or below, preferably 2 µm or above and 20 µm or below, further preferably 2 µm or above and 10 µm or below, and more preferably 2 µm or above and 6 µm or below.

3. Decorative Layer

The decorative layer in the hard coat film of this embodiment is a layer positioned on a side of the primer layer which is opposite side to the hard coat layer.

The decorative layer contains a coloring agent and a binder resin. There is no particular limitation on the binder resin included in the decorative layer, and it may be a resin used in general decorative layers. Examples of the resin may include a polyvinyl-based resin, a polyester-based resin, an acrylic resin, a polyvinylacetal-based resin, and a cellulose-based resin.

Also, there is no particular limitation on the coloring agent included in the decorative layer, and it may be a publicly known coloring agent used in general decorative layers. Examples of the coloring agent may include an inorganic pigment such as carbon black, iron black, titanium white, antimony white, chrome yellow, titanium yellow, Bengala (red iron oxide), cadmium red, gunjo (ultramarine), and cobalt blue; and an organic pigment or dye of which base is azo, phthalocyanine, anthraquinone, perylene, perynone, quinacridone, thioindigo, dioxazine, isoindolinone, quinophthalone, azomethineazo, diketopyrrolopyrrole, and isoindolin. Above all, inclusion of a coloring agent that is easily deteriorated by receiving light having a wavelength of 380 nm and nearby may exhibit the effect of the present disclosure more.

The decorative layer may be positioned partially or entirely on the surface of the primer layer which is opposite side to the hard coat layer side surface. Also, the decorative layer may be in a non-pattern shape that covers entire surface of the primer layer which is opposite side to the hard coat layer side surface, and may be in a pattern shape wherein the decorative layer positioned region and not-positioned region are present on the surface of the primer layer which is the opposite side to the hard coat layer side surface. Also, the decorative layer in a pattern shape may express a desired design. There is no particular limitation on the design; for example, it may be patterns or designs such as words, figures, and symbols.

The decorative layer may be transparent, may be semi-transparent, and may be opaque.

There is no particular limitation on the thickness of the decorative layer; for example, it may be 5 µm or above and 40 µm or below, and preferably 5 µm or above and 30 µm or below.

4. Substrate Layer

The substrate layer in the hard coat film of this embodiment is positioned on the surface of the hard coat layer which is opposite side to the primer layer side surface. In the hard coat film of this embodiment, the substrate layer is a member that is peeled off when the hard coat film of this embodiment is transferred to a resin base.

There is no particular limitation on the substrate layer, and the one used as a peeling layer in general transferring films may be used. Examples thereof may include a resin film such as a polyester resin film and a polyolefin resin film.

The substrate layer may or may not have transparency, and may or may not have color; they may be appropriately determined.

The hard coat layer side surface of the substrate layer may be subjected to a publicly known mold release treatment, and a mold release layer such as a silicone resin may be arranged thereon. The reason therefor is that the peeling off would be easy between the substrate layer and the hard coat layer.

There is no particular limitation on the thickness of the substrate layer; for example, it may be 4 µm or above and 200 µm or below. The substrate layer may be a single layer structure and may be a multilayer structure. In the case of the multilayer structure, the thickness of the multilayer structure as a whole may be in the above described range.

5. Adhesive Layer

The hard coat film of this embodiment may comprise an adhesive layer on the surface of the decorative layer which is opposite side to the primer layer side surface. In this embodiment, heat sealing properties are included in the adhesive layer and thus the hard coat film of this embodiment may be transferred and attached to a resin base interposing the adhesive layer. Incidentally, heat sealing properties signify a characteristic such that when a resin included in the adhesive layer is heated in a desired condition and melted, it would be able to adhere to an article.

When the adhesive layer has heat sealing properties, in other words, when the adhesive layer is a heat sealing layer, the adhesive layer contains a thermoplastic resin that can be melted by heat. There is no particular limitation on the thermoplastic resin, and examples thereof may include an acryl resin, a vinylchloride-vinylacetate copolymer, a polyamide resin, a polyester resin, chlorinated polypropylene, chlorinated rubber, a urethane resin, an epoxy resin, and a styrene resin. The resin may be used solely, and the combination of two kinds or more thereof may be used.

There is no particular limitation on the thickness of the adhesive layer, and the thickness may be appropriately determined so as to obtain sufficient adhesiveness when the hard coat film of this embodiment is attached to a resin base. Examples of the thickness may be 1 µm or above and 7 µm or below, and preferably 1 µm or above and 6 µm or below.

6. Others

In the hard coat film of this embodiment, when the first layer in the primer layer is positioned between the second layer in the primer layer and the hard coat layer, the first layer in the primer layer and the hard coat layer are formed as separate bodies, but the first layer in the primer layer and the hard coat layer may be formed as an integral body. A single layer formed of the first layer in the primer layer and the hard coat layer integrally may be a first layer as well as hard coat layer. The first layer as well as hard coat layer may exhibit both of functions, the wavelength absorbing properties of the first layer, and the function of the hard coat layer when, for example, the resin included in the first layer is the resin cured product included in the hard coat layer.

Also, in the hard coat film of this embodiment, when the second layer in the primer layer is positioned between the first layer in the primer layer and the hard coat layer, the second layer in the primer layer and the hard coat layer are formed as separate bodies, but the second layer in the primer layer and the hard coat layer may be formed as an integral body. A single layer formed of the second layer in the primer layer and the hard coat layer integrally may be a second layer as well as hard coat layer. The second layer as well as hard coat layer may exhibit both of functions, the wavelength absorbing properties of the second layer, and the function of the hard coat layer when, for example, the resin included in the second layer is the resin cured product included in the hard coat layer.

Also, in the hard coat film of this embodiment, the decorative layer and the adhesive layer on the surface of the decorative layer which is opposite side to the primer layer side surface are formed as separate bodies, but the decorative layer and the adhesive layer may be formed as an integral body. A single layer formed of the decorative layer and the adhesive layer on the surface of the decorative layer which is opposite side to the primer layer side surface integrally may be a decorative layer as well as adhesive layer. The decorative layer as well as adhesive layer may exhibit both of functions, a function as the decorative layer and an adhesive function when, for example, the decorative layer contains a thermally weldable thermoplastic resin.

7. Production Method

Method for producing the hard coat film of this embodiment is not particularly limited; for example, it may be obtained in a manner such that a composition for forming a hard coat layer is pasted on a substrate layer and cured to form a hard coat layer, a composition for forming a first layer is pasted on the hard coat layer and cured as required to form a first layer, a composition for forming a second layer is pasted on the first layer and cured as required to form a second layer, a composition for forming a decorative layer is pasted on the second layer to form a decorative layer, and a thermoplastic resin is pasted on the decorative layer to form an adhesive layer having heat sealing properties.

B. Hard Coat Film in Second Embodiment

The hard coat film of this embodiment comprises a hard coat layer, a primer layer, and a decorative layer in this order, wherein the primer layer includes a first layer of which transmittance with respect to light having a wavelength of 380 nm is 30% or below; a second layer of which transmittance with respect to light having a wavelength of 340 nm is 10% or below, and the first layer and the second layer are layered, in no particular order, between the hard coat layer and the decorative layer; and a substrate layer is included in the position of the surface of the decorative layer which is opposite side to the primer layer side surface.

Figure 4:
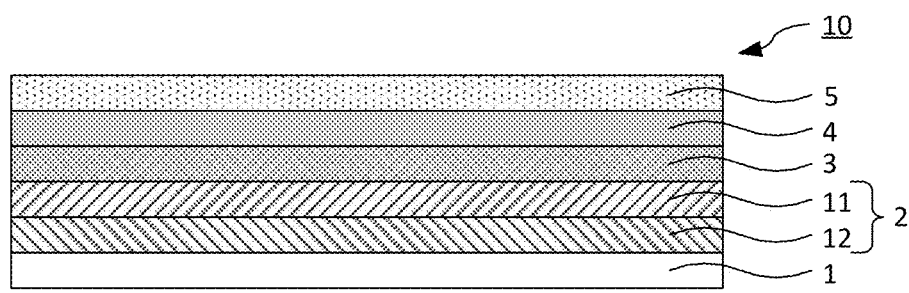
FIG. 4 is a schematic cross-sectional view illustrating an example of a hard coat film in the second embodiment of the present disclosure.

FIG. 4 is a schematic cross-sectional view illustrating an example of the hard coat film in this embodiment, which is the same as FIG. 1 except that the substrate layer 4 in the hard coat film 10 of the first embodiment exemplified in FIG. 1 is included in the position of the surface of the decorative layer 3 which is opposite side to the primer layer 2 side surface.

The hard coat film of this embodiment includes an adhesive function in the outermost surface of the substrate layer side so as to form a hard coat film for lamination, which can be laminated on an article. For example, as illustrated in FIG. 4, the hard coat film 10 of this embodiment includes adhesive layer (adhesive layer or bonding agent layer) 5 containing an adhesive agent or a bonding agent on the surface of the substrate layer 4 which is opposite side to the decorative layer 3 side surface, and thus the hard coat film of this embodiment may be laminated on an article interposing the adhesive layer. Also, the hard coat film 10 of this embodiment may be an embodiment such that the substrate layer 4 has a function to adhere to an article so as to be laminated on an article without further arranging the adhesive layer 5.

Figure 5:
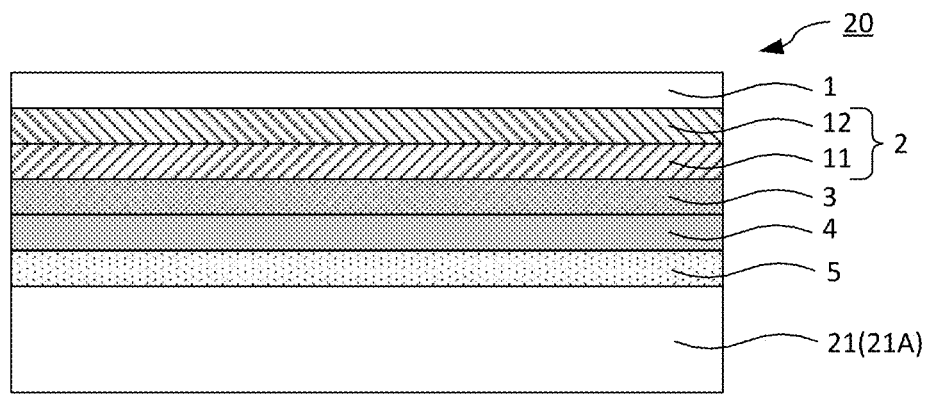
FIG. 5 is a schematic cross-sectional view illustrating an additional example of the laminate in the first embodiment of the present disclosure.

FIG. 5 is a schematic cross-sectional view illustrating an example of a laminate obtained by laminating the hard coat film of this embodiment on a resin base. Laminate 20 illustrated in FIG. 5 comprises resin base 21, substrate layer 4, decorative layer 3, primer layer 2, and hard coat layer 1 in this order. The primer layer 2 includes first layer 11 of which transmittance with respect to light having a wavelength of 380 nm is a specified value or below, and second layer 12 of which transmittance with respect to light having a wavelength of 340 nm is a specified value or below, and the first layer 11 and the second layer 12 are layered, in no particular order, between the hard coat layer 1 and the decorative layer 3. In the laminate 20 illustrated in FIG. 5, in the primer layer 2, the second layer 12 and the first layer 11 are layered in this order from the hard coat layer 1 side. Also, in FIG. 5, adhesive layer 5 is present between the substrate layer 4 and the resin base 21. Incidentally, FIG. 5 shows an example where the resin base 21 is transparent resin base 21A, but it may be a coloring resin base containing a coloring agent.

With the hard coat film of this embodiment, for the reasons described in the section "A. Hard coat film in first embodiment" above, when it is attached to a resin base so as the decorative layer comes to the resin base side with respect to the hard coat layer to form a laminate, photodegradation of the coloring resin members positioned in the opposite side to the light entering side in the first layer and the second layer configured in the primer layer may be inhibited, and the weather resistance of the laminate may be improved.

Below, each constitution of the hard coat film in this embodiment will be described. Incidentally, details of the hard coat layer, the first layer and the second layer in the primer layer, as well as the decorative layer in the hard coat film of this embodiment are in the same contents as those described in the section "A. Hard coat film in first embodiment" above; thus, descriptions herein are omitted.

1. Substrate Layer

The substrate layer in the hard coat film of this embodiment is positioned on the surface of the decorative layer which is opposite side to the primer layer side surface. In the hard coat film of this embodiment, the substrate layer is positioned on a resin base together with other constitutions without being peeled off when the hard coat film of this embodiment is laminated on the resin base.

There is no particular limitation on the substrate layer; for example, a resin film such as an acryl resin film, a polyester resin film, a polyolefin resin film, and a polyvinylchloride resin film may be used.

The substrate layer may or may not have transparency. Also, the substrate layer may be a coloring substrate layer including a coloring agent, and may be colorless. When the substrate layer is a coloring substrate layer, in a laminate in which the hard coat film of this embodiment is attached to a resin base so as the decorative layer comes to the resin base side with respect to the decorative layer side, the coloring substrate layer is positioned on a side of the primer layer which is opposite to the light entering side. For that reason, among light entered to the coloring resin base from the hard coat layer side, light having specific wavelengths are absorbed in the first layer and the second layer configured in the primer layer, and thus photodegradation of the coloring substrate layer may be inhibited.

In this embodiment, at least the hard coat layer side surface of the substrate layer may be subjected to a publicly known surface modification treatment, and a coating layer of an easy adhesion coating agent may be arranged thereon. The reason therefor is to improve cohesiveness between the substrate layer and the hard coat layer.

There is no particular limitation on the thickness of the substrate layer; for example, it may be 4 µm or above and 200 µm or below. The substrate layer may be a single layer structure, and may be a multilayer structure. In the case of the multilayer structure, the thickness of the multilayer structure as a whole may be in the above described range.

2. Adhesive Layer

The hard coat film of this embodiment may comprise an adhesive layer on the surface of the substrate layer which is opposite side surface to the decorative layer side surface. The reason therefor is that thereby the hard coat film of this embodiment may be laminated on a resin base interposing the adhesive layer.

In this embodiment, the adhesive layer may be an adhesive layer (bonding agent layer) containing a bonding agent, or an adhesive layer (adhesive agent layer) containing an adhesive agent. There is no particular limitation on a resin that configures the adhesive agent layer or the bonding agent layer, and it may be same as the resin included in general adhesive agents or bonding agents used for lamination. Examples of the resin may include an acrylic resin, an ester-based resin, a urethane-based resin, an ethylene-vinyl-acetate-based resin, a latex-based resin, an epoxy-based resin, a polyurethane-ester-based resin, a fluorine-based resin such as a vinylidene-fluoride-based resin (PVDF), and a vinyl-fluoride-based resin (PVF), a resin basing on polyimide such as polyimide, polyamide imide, and polyether imide.

Also, in this embodiment, the adhesive layer may be a heat sealing layer. The heat sealing layer is in the same contents as those described in the section "A. Hard coat film in first embodiment 5. Adhesive layer" above; thus, the descriptions herein are omitted.

There is no particular limitation on the thickness of the adhesive layer, and it may be appropriately determined so as to obtain sufficient adhesiveness when the hard coat film of this embodiment is attached to a resin base. For example, it may be 1 µm or above and 7 µm or below, and preferably 1 µm or above and 6 µm or below.

3. Others

In the hard coat film of this embodiment, the first layer and the second layer configured in the primer layer may be layered in the order of the second layer and the first layer from the hard coat layer side, and may be layered in the order of the first layer and the second layer from the hard coat layer side. Among them, in the primer layer, the second layer and the first layer are preferably layered in this order from the hard coat layer side. The reason therefor is described in the section "A. Hard coat film in first embodiment" above; thus, the description herein is omitted.

In the hard coat film of this embodiment, when the first layer in the primer layer is positioned between the second layer in the primer layer and the hard coat layer, the first layer in the primer layer and the hard coat layer are formed as separate bodies, but the first layer and the hard coat layer may be formed as an integral body. Also, in the hard coat film of this embodiment, when the second layer in the primer layer is positioned between the first layer in the primer layer and the hard coat layer, the second layer in the primer layer and the hard coat layer are formed as separate bodies, but the second layer and the hard coat layer may be formed as an integral body.

In the hard coat film of this embodiment, the substrate layer and the adhesive layer on the surface of the substrate layer which is opposite side to the decorative layer side surface are formed as separate bodies, but the substrate layer and the adhesive layer may be formed as an integral body. A single layer formed of the substrate layer and the adhesive layer on the surface of the substrate layer which is opposite side to the decorative layer side surface integrally may be a substrate layer as well as adhesive layer. The substrate layer as well as adhesive layer may exhibit both functions, a function as the substrate layer and an adhesive function when for example, for example, the substrate layer contains a thermoplastic resin.

4. Production Method

Method for producing the hard coat film of this embodiment is not particularly limited; for example, it may be obtained in a manner such that a composition for forming a decorative layer is pasted on one surface of the substrate layer to form a decorative layer, a composition for forming a first layer is pasted on the decorative layer and cured as required to form a first layer, a composition for forming a second layer is pasted on the first layer and cured as required to form a second layer, a composition for forming a hard coat layer is pasted on the second layer and cured to form a hard coat layer, and an adhesive agent or a bonding agent is pasted on the surface of the substrate layer which is opposite to the decorative layer side surface to form an adhesive layer.

C. Hard Coat Film in Third Embodiment

The hard coat film in this embodiment comprises a hard coat layer and a primer layer, wherein the primer layer includes a first layer of which transmittance with respect to light having a wavelength of 380 nm is 30% or below, and a second layer of which transmittance with respect to light having a wavelength of 340 nm is 10% or below; the first layer and the second layer are layered, in no particular order, in the position of one surface of the hard coat layer; and a substrate layer is included in the position of the surface of the hard coat layer which is opposite side to the primer layer side surface.

Figure 6:
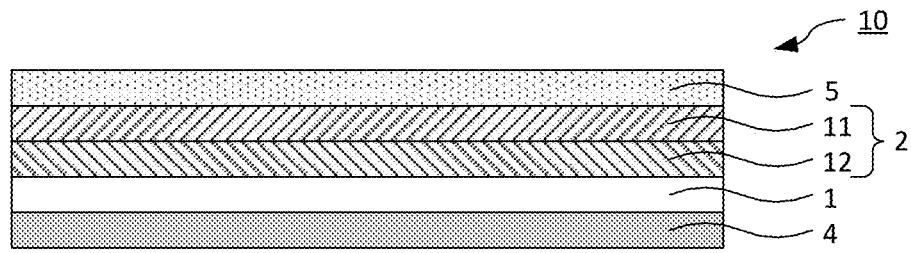
FIG. 6 is a schematic cross-sectional view illustrating an example of a hard coat film in the third embodiment of the present disclosure.

FIG. 6 is a schematic cross-sectional view illustrating an example of the hard coat film in this embodiment. Hard coat film 10 in this embodiment comprises hard coat layer 1, and primer layer 2, in this order. The primer layer 2 includes first layer 11 of which transmittance with respect to light having a wavelength of 380 nm is a specified value or below, and second layer 12 of which transmittance with respect to light having a wavelength of 340 nm is a specified value or below, and the first layer 11 and the second layer 12 are layered, in no particular order, on one surface of the hard coat layer 1. In the hard coat film 10 of this embodiment illustrated in FIG. 6, the second layer 12 and the first layer 11 are layered in this order from the hard coat layer 1 side. Also, the hard coat film 10 in this embodiment includes substrate layer 4 on the surface of the hard coat layer 1 which is opposite side to the primer layer 2 side surface.

The hard coat film of this embodiment includes an adhesive function in the outermost surface which is the opposite side to the substrate layer, and thus it may be a hard coat film for transfer such that constitutions other than the substrate layer may be transferred to an article. For example, as illustrated in FIG. 6, hard coat film 10 in this embodiment includes adhesive layer (heat sealing layer) 5 that has heat sealing properties, on the surface of the primer layer 2 which is opposite side to the hard coat layer 1 side surface, and thus the hard coat film in this embodiment excluding the substrate layer may be transferred and attached to an article interposing the adhesive layer. Also, the hard coat film 10 of this embodiment may be an embodiment in which the primer layer 2 has a function of adhering to an article, so as to be transferred and attached to an article without further arranging the adhesive layer 5.

Figure 7:
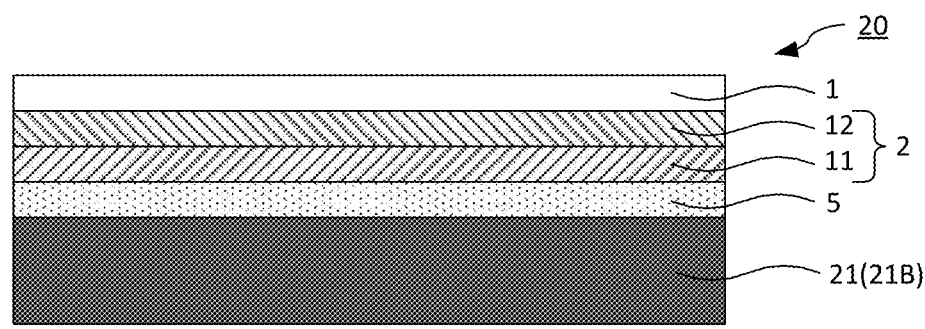
FIG. 7 is a schematic cross-sectional view illustrating an example of a laminate in the second embodiment of the present disclosure.

FIG. 7 is a schematic cross-sectional view illustrating an example of a laminate obtained by transferring and attaching the hard coat film in this embodiment to a resin base. Laminate 20 illustrated in FIG. 7 comprises coloring resin base 21B, primer layer 2, and hard coat layer 1, in this order. The primer layer 2 includes first layer 11 of which transmittance with respect to light having a wavelength of 380 nm is a specified value or below, and second layer 12 of which transmittance with respect to light having a wavelength of 340 nm is a specified value or below, and the first layer 11 and the second layer 12 are layered, in no particular order, between the hard coat layer 1 and the coloring resin base 21B. In the laminate 20 illustrated in FIG. 7, in the primer layer 2, the second layer 12 and the first layer 11 are layered in this order from the hard coat layer 1 side. Also, in FIG. 7, adhesive layer (heat sealing layer) 5 is present between the primer layer 2 and the coloring resin base 21B.

With the hard coat film of this embodiment, when it is attached to a colorless or coloring resin base, on which a coloring resin base and a decorative layer are arranged, to form a laminate so as the primer layer comes to the resin base side with respect to the hard coat layer, the first layer and the second layer configured in the primer layer are positioned between the hard coat layer and the coloring resin members such as the decorative layer and the coloring resin base. Accordingly, for the reason described in the section "A. Hard coat film in first embodiment" above, photodegradation of the coloring resin members positioned on a side of the primer layer which is opposite to light entering side in the primer layer, may be inhibited, and the weather resistance of the laminate may be improved.

The hard coat film of this embodiment may be in the same contents as those described in the section "A. Hard coat film in first embodiment" above except that the decorative layer is not included in the configuration.

The hard coat film of this embodiment may include an adhesive layer on the surface of the primer layer which is opposite side to the hard coat layer side surface. In this embodiment, the adhesive layer may be an adhesive layer having heat sealing properties. The adhesive layer having heat sealing properties is explained in the section "A. Hard coat film in first embodiment" above; thus, the description herein is omitted.

In the hard coat film of this embodiment, when the first layer in the primer layer is positioned between the second layer in the primer layer and the hard coat layer, the first layer in the primer layer and the hard coat layer are formed as separate bodies, but it may be a first layer as well as hard coat layer in which the first layer and the hard coat layer are formed as an integral body. Also, when the second layer in the primer layer is positioned between the first layer in the primer layer and the hard coat layer, the second layer in the primer layer and the hard coat layer are formed as separate bodies, but it may be a second layer as well as hard coat layer in which the second layer and the hard coat layer are formed as an integral body.

In the hard coat film of this embodiment, when the adhesive layer is present on the surface of the primer layer which is opposite side to the hard coat layer side surface, one of the first layer and the second layer positioned in the adhesive layer side and the adhesive layer are formed as separate bodies, but may be formed as an integral body. In other words, in the hard coat film of this embodiment, when the second layer in the primer layer is positioned between the first layer in the primer layer and the hard coat layer, the first layer and the adhesive layer on the surface of the first layer which is opposite side to the second layer side surface, may be formed as an integral body. A single layer formed of the first layer in the primer layer and the adhesive layer integrally may be a first layer as well as adhesive layer. The first layer as well as adhesive layer may exhibit both functions of the wavelength absorbing properties of the first layer and an adhesive function when, for example, the resin included in the first layer is a thermoplastic resin included in the adhesive layer. The same is true for the case when the first layer in the primer layer is positioned between the second layer in the primer layer and the hard coat layer, and both functions of the wavelength absorbing properties of the second layer and an adhesive function may be exhibited when a second layer as well as adhesive layer is formed.

The method for producing the hard coat film of this embodiment is not particularly limited; for example, it may be the production method exemplified in the section "A. Hard coat film in first embodiment" above, excluding the step of forming a decorative layer.

D. Hard Coat Film in Fourth Embodiment

The hard coat film in this embodiment comprises a hard coat layer and a primer layer, wherein the primer layer includes a first layer of which transmittance with respect to light having a wavelength of 380 nm is 30% or below, and a second layer of which transmittance with respect to light having a wavelength of 340 nm is 10% or below; the first layer and the second layer are layered, in no particular order, in the position of one surface of the hard coat layer; and a substrate layer is included in the position of a surface of the primer layer which is opposite side to the hard coat layer side surface.

Figure 8:
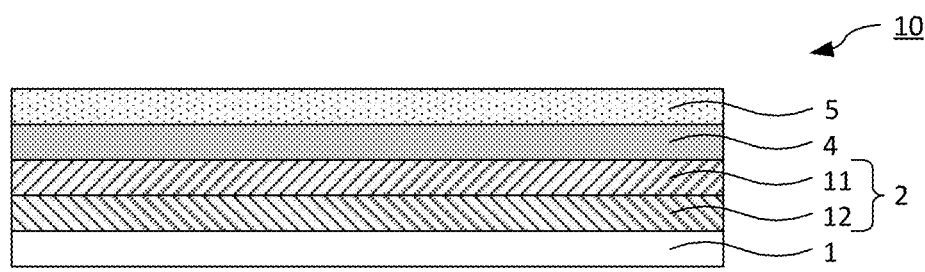
FIG. 8 is a schematic cross-sectional view illustrating an example of a hard coat film in the fourth embodiment of the present disclosure.

FIG. 8 is a schematic cross-sectional view illustrating an example of the hard coat film of this embodiment, and it is same as the hard coat film 10 in the third embodiment illustrated in FIG. 6, except that the substrate layer 4 is present on the surface of the primer layer 2 which is opposite to the hard coat layer 1 side surface.

The hard coat film of this embodiment has an adhesive function in the outermost surface of the substrate layer side and thus it may be a hard coat film for lamination, with which an article may be laminated. For example, as illustrated in FIG. 8, the hard coat film 10 of this embodiment includes the adhesive layer 5 on the surface of the substrate layer 4 which is opposite side to the primer layer 2 side surface, and thus the hard coat film of this embodiment may be laminated on an article interposing the adhesive layer. Also, the hard coat film 10 of this embodiment may be an embodiment in which the substrate layer 4 has a function of adhering to an article so as to laminate an article without further arranging the adhesive layer 5.

Figure 9:
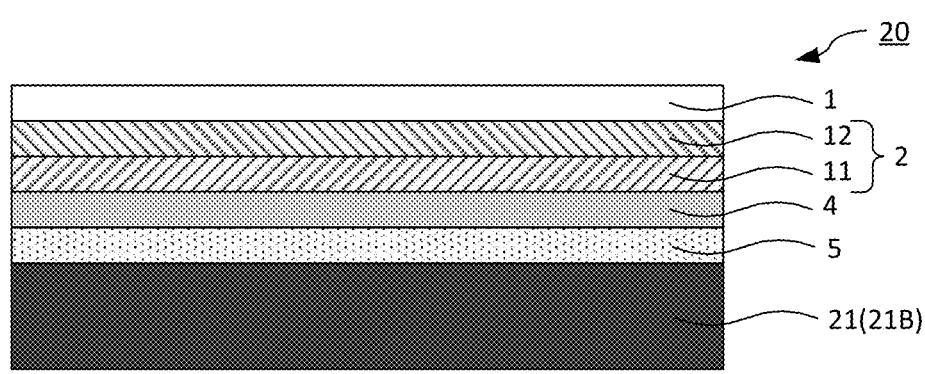
FIG. 9 is a schematic cross-sectional view illustrating an additional example of the laminate in the second embodiment of the present disclosure.

FIG. 9 is a schematic cross-sectional view illustrating an example of a laminate obtained by laminating the hard coat film of this embodiment on a resin base. Laminate 20 illustrated in FIG. 9 comprises coloring resin base 21B, substrate layer 4, primer layer 2, and hard coat layer 1, in this order. The primer layer 2 includes first layer 11 of which transmittance with respect to light having a wavelength of 380 nm is a specified value or below, and second layer 12 of which transmittance with respect to light having a wavelength of 340 nm is a specified value or below, and the first layer 11 and the second layer 12 are layered, in no particular order, between the hard coat layer 1 and the coloring resin base 21B. In the laminate 20 illustrated in FIG. 9, in the primer layer 2, the second layer 12 and the first layer 11 are layered in this order from the hard coat layer 1 side. Also, in FIG. 9, adhesive layer 5 is present between the primer layer 2 and the coloring resin base 21B, and the substrate layer 4 is present between the adhesive layer 5 and the primer layer 2.

With the hard coat film of this embodiment, when it is attached to a colorless or coloring resin base, on which a coloring resin base and a decorative layer are arranged, to form a laminate so as the primer layer comes to the resin base side with respect to the hard coat layer, the first layer and the second layer configured in the primer layer are positioned between the hard coat layer and the coloring resin members such as the decorative layer and the coloring resin base. Accordingly, for the reason described in the section "A. Hard coat film in first embodiment" above, photodegradation of the coloring resin members positioned on the side of the primer layer which is opposite to light entering side in the laminate, may be inhibited, and the weather resistance of the laminate may be improved.

The hard coat film of this embodiment may be in the same contents as those explained in the section "B. Hard coat film in second embodiment" above, except that the decorative layer is not included in the configuration.

In the hard coat film of this embodiment, when the first layer in the primer layer is positioned between the second layer in the primer layer and the hard coat layer, the first layer in the primer layer and the hard coat layer are formed as separate bodies, but the first layer and the hard coat layer may be formed as an integral body. Also, in the hard coat film of this embodiment, when the second layer in the primer layer is positioned between the first layer in the primer layer and the hard coat layer, the second layer in the primer layer and the hard coat layer are formed as separate bodies, but the second layer and the hard coat layer may be formed as an integral body.

In the hard coat film of this embodiment, the substrate layer and the adhesive layer on the surface of the substrate layer which is opposite side to the primer layer side surface are formed as separate bodies, but the substrate layer and the adhesive layer may be formed as an integral body.

The method for producing the hard coat film of this embodiment is not particularly limited, and may be, for example, the method exemplified in the section "B. Hard coat film in second embodiment" above excluding the step of forming the decorative layer.

II. Laminate

Next, the laminate of the present disclosure will be described. The laminate of the present disclosure may be categorized into roughly two embodiments depending on its layer structure. The laminate in each embodiment will be hereinafter respectively described.

A. Laminate in First Embodiment

The laminate in this embodiment comprises a resin base, a decorative layer, a primer layer, and a hard coat layer, in this order, wherein the primer layer includes a first layer of which transmittance with respect to light having a wavelength of 380 nm is 30% or below, and a second layer of which transmittance with respect to light having a wavelength of 340 nm is 10% or below; and the first layer and the second layer are layered, in no particular order, between the hard coat layer and the decorative layer.

FIG. 2 and FIG. 5 already explained are the schematic cross-sectional views respectively illustrating an example of the laminate in this embodiment.

In the laminate of this embodiment, the first layer and the second layer configured in the primer layer are positioned between the hard coat layer and the decorative layer, and thus, among light that enters to the decorative layer from the hard coat layer side, light having a wavelength that causes the photodegradation of the coloring agent may be absorbed in the first layer in advance, and light having a wavelength that causes the photodegradation of the resin may be absorbed in the second layer in advance. Thereby, light of these wavelengths would have difficulty reaching at the coloring resin members such as the decorative layer and the coloring resin base, and thus the photodegradation of the coloring resin members may be inhibited and the laminate may have high weather resistance.

Below, each constitution of the laminate in this embodiment will be described. Incidentally, the members such as the decorative layer, the primer layer, and the hard coat layer in the laminate of this embodiment are described in details in the sections "A. First embodiment" and "B. Second embodiment" of "I. Hard coat film" above; thus, the descriptions herein are omitted.

Incidentally, the transmittance of the first layer and the second layer in the laminate of this embodiment with respect to each light having a wavelength of 380 nm and a wavelength of 340 nm may be measured with the method described in the section "A. First embodiment" of "I. Hard coat film" above. Also, regarding a method for calculating each light transmittance of the first layer and the second layer from the laminate, the calculation may be done with the method described in the section "A. First embodiment" of "I. Hard coat film" above; in the laminate after removing the coloring members such as the resin base and the decorative layer, the light transmittance of the first layer solely and the second layer solely may be respectively calculated from the difference between the light transmittances before and after removing the first layer, and the difference between the light transmittances before and after removing the second layer.

1. Resin Base

There is no particular limitation on the resin that configures the resin base in this embodiment, and examples thereof may include an acryl resin, an sacrylonitrile-butadiene-styrene copolymer (ABS) resin, a polyolefin resin, and a polycarbonate resin. The resin base may be configured by a sole resin material of the above, and may be configured by a complex resin material in which plurality of the kind of the above are combined.

In this embodiment, the resin base may be transparent, may be semitransparent, and may be opaque. Also, in this embodiment, the resin base may be a coloring resin base including a coloring agent, and may be a colorless resin base not including a coloring agent. Examples of the coloring agent may include various inorganic pigments and organic pigments or dyes exemplified in the section "A. First embodiment 3. Decorative layer" of "I. Hard coat film" above.

There is no particular limitation on the thickness of the resin base, and it may be appropriately determined from properties such as practical strength and workability. For example, the thickness may be 1 mm or above and 20 mm or below, and preferably 2 mm or above and 10 mm or below.

2. Adhesive Layer

The adhesive layer in this embodiment may include an adhesive layer between the decorative layer and the resin base. The adhesive layer may be an adhesive agent layer including an adhesive agent, may be a bonding agent layer including a bonding agent, and may be a heat sealing layer having heat sealing properties. The adhesive layer is the same as the adhesive layer described in the sections "A. First embodiment" and "B. Second embodiment" of "I. Hard coat film" above; thus, the description herein is omitted. The decorative layer and the adhesive layer are formed as separate bodies, but may be formed as an integral body.

3. Substrate Layer

When the laminate in this embodiment is the one formed by attaching the hard coat film described in "I. Hard coat film B. Second embodiment" above, to a resin base, it may further include a substrate layer between the decorative layer and the resin base. The substrate layer is described in the section "I. Hard coat film B. Second embodiment" above; thus, the description herein is omitted. In the aforementioned case, the substrate layer and the adhesive layer are formed as separate bodies, but may be formed as an integral body.

4. Others

In the laminate of this embodiment, the first layer and the second layer that configures the primer layer may be layered in the order of the second layer and the first layer from the hard coat layer side, and may be layered in the order of the first layer and the second layer from the hard coat layer side. Among them, in the primer layer, it is preferable that the first layer and the second layer are layered in this order form the hard coat layer side. The reason therefor is explained in the section "A. First embodiment" of "I. Hard coat film" above; thus, the description herein is omitted.

In the laminate of this embodiment, the first layer in the primer layer and the hard coat layer may be formed as an integral body, and the second layer in the primer layer and the hard coat layer may be formed as an integral body depending on the layering order of the first layer and the second layer.

The laminate in this embodiment may be formed by, for example, transferring and attaching the hard coat film in the first embodiment, to a resin base, or by laminating a resin base with the hard coat film in the second embodiment, described in the section "I. Hard coat film" above.

B. Laminate in Second Embodiment

The laminate in this embodiment comprises a coloring resin base, a primer layer, and a hard coat layer, in this order, wherein the primer layer includes a first layer of which transmittance with respect to light having a wavelength of 380 nm is 30% or below, and a second layer of which transmittance with respect to light having a wavelength of 340 nm is 10% or below; and the first layer and the second layer are layered, in no particular order, between the hard coat layer and the coloring resin base.

FIG. 7 and FIG. 9 already explained are schematic cross-sectional views respectively illustrating an example of the laminate in this embodiment.

In the laminate of this embodiment, the first layer and the second layer configured in the primer layer are positioned between the hard coat layer and the coloring resin base, and thus, among light that enters to the coloring resin base from the hard coat layer side, light having a wavelength that causes the photodegradation of the coloring agent may be absorbed in the first layer in advance, and light having a wavelength that causes the photodegradation of the resin may be absorbed in the second layer in advance. Thereby, light of these wavelengths would have difficulty reaching at the coloring resin base, and thus the photodegradation of the coloring resin base may be inhibited and the laminate may have high weather resistance.

Below, each constitution of the laminate in this embodiment will be described. Incidentally, members such as the decorative layer, the primer layer, and the hard coat layer in the laminate of this embodiment are described in details in the sections "A. First embodiment" and "B. Second embodiment" of "I. Hard coat film" above; thus, the descriptions herein are omitted.

1. Coloring Resin Base

The coloring resin base in this embodiment may be the same as the resin base described in the section "A. Laminate in first embodiment" above, except that the resin base is required to include a coloring agent; thus, the description herein is omitted.

The coloring resin base may include a decorative layer on the primer layer side surface. The decorative layer is described in the section "I. Hard coat film A. First embodiment" above; thus, the description herein is omitted.

2. Adhesive Layer

The laminate in this embodiment may include an adhesive layer between the primer layer and the coloring resin base. The adhesive layer may be the same as the adhesive layer in the laminate of the first embodiment; thus, the description herein is omitted. In this case, one of the first layer and the second layer which is positioned in the adhesive layer side in the primer layer is formed as a separate body from the adhesive layer, but may be formed as an integral body with the adhesive layer. It means that the second layer in the primer layer and the adhesive layer may be formed as an integral body, and the first layer in the primer layer and the adhesive layer may be formed as an integral body depending on the layering order of the first layer and the second layer in the primer layer.

3. Substrate Layer

When the laminate of this embodiment is the one formed by attaching the hard coat film described in "I. Hard coat film D. Fourth embodiment" above, to a resin base, it may further include a substrate layer between the adhesive layer and the primer layer. The substrate layer is described in the section "I. Hard coat film B. Second embodiment" above; thus, the description herein is omitted. In the aforementioned case, the adhesive layer and the substrate layer are formed as separate bodies, but may be formed as an integral body.

4. Others

In the laminate of this embodiment, the first layer and the second layer in the primer layer may be layered in the order of the second layer and the first layer from the hard coat layer side, and may be layered in the order of the first layer and the second layer from the hard coat layer side. Among them, in the primer layer, it is preferable that the second layer and the first layer are layered in this order from the hard coat layer side. The reason therefor is explained in the section "A. First embodiment" in "I. Hard coat film" above; thus, the description herein is omitted.

In the laminate of this embodiment, the first layer in the primer layer and the hard coat layer may be formed as an integral body depending on the layering order of the first layer and the second layer. In the same manner, the second layer in the primer layer and the hard coat layer may be formed as an integral body.

The laminate of this embodiment may be formed by, for example, transferring and attaching the hard coat film of the third embodiment described in the section "I. Hard coat film" above, to a resin base, or by laminating a resin base with the hard coat film of the fourth embodiment.

Incidentally, the present disclosure is not limited to the above-described embodiments. The above-describe embodiments are examples, and everything having a composition that is substantially the same as the technical idea described in the claims of this disclosure and having the same efficacy are included within the technical scope of this disclosure.

EXAMPLES

Below, examples and comparative examples are shown and the present disclosure is described in greater details.

The details of the materials used for fabricating a hard coat film are as below.

<Substrate Layer>
Polyethylene terephthalate (PET) resin film (thickness: 50 μm, TOYOBO ester film A4100 from TOYOBO CO., LTD.)
<Composition for Forming Hard Coat Layer>
Urethane acrylate-based ionizing radiation curable resin (SEIKABEAM SEB-TRHC from Dainichiseika Color & Chemicals Mfg. Co., Ltd.) . . . 100 parts by mass
<Composition for Forming First Layer>
Acryl resin (TM-R600(NT)K3 from Dainichiseika Color & Chemicals Mfg. Co., Ltd.) . . . 100 parts by mass
2,2',4,4'-tetrahydroxybenzophenone (a benzophenone-based ultraviolet absorbing agent, Uvinu13050 from BASF) . . . 1.4 parts by mass <Composition for Forming Second Layer>
Acryl urethane resin (SG-131 primer from DIC Graphics Corporation) . . . 100 parts by mass
Hexane methylene diisocyanate (A curing agent from Dainichiseika Color & Chemicals Mfg. Co., Ltd.) . . . 6 parts by mass
Triazine-based ultraviolet absorbing agent (Tinuvin400 and Tinuvin479 from BASF, two kinds used together) . . . 30 parts by mass (total amount of the two kinds)
<Composition for Forming Adhesive Layer>
Acrylic resin (Product name: TM-R600(NT)K3 from Dainichiseika Color & Chemicals Mfg. Co., Ltd.) . . . 100 parts by mass Example 1

A composition for forming hard coat layer was pasted on one surface of the substrate layer to form an uncured resin layer. An electron beam was irradiated to the said uncured resin layer in the conditions of 90 kV and 7 Mrad (70 kGy) for crosslinking and curing the said uncured resin layer, and thereby a hard coat layer (layer thickness: 1.5 μm) was formed. A corona discharge treatment was conducted to the surface of the said hard coat layer which is the opposite side to the substrate layer, the composition for forming second layer was pasted thereon to form a second layer (layer thickness: 2.5 μm), and the composition for forming first layer was pasted on the second layer to form a first layer (layer thickness: 2.5 μm). Further, a weather resistant red ink (DPP pigment from SHOWA INK MANUFACTURING CO., LTD) was pasted on the first layer to form a red decorative layer (layer thickness: 2.5 μm). The composition for forming adhesive layer was pasted on the decorative layer to form an adhesive layer having heat sealing properties (layer thickness: 2.8 μm), and thereby a hard coat film was obtained.

Example 2

A hard coat film was obtained in the same manner as in Example 1, except that a weather resistant yellow ink (azo nickel pigment from SHOWA INK MANUFACTURING CO., LTD) was pasted to form a yellow decorative layer (layer thickness: 2.5 μm) replacing the red decorative layer.

Example 3

A hard coat film was obtained in the same manner as in Example 1, except that a weather resistant blue ink (phthalocyanine pigment from SHOWA INK MANUFACTURING CO., LTD) was pasted to form a blue decorative layer (layer thickness: 2.5 μm) replacing the red decorative layer.

Comparative Example 1

A hard coat film was obtained in the same manner as in Example 1 except that the 2,2',4,4'-tetrahydroxybenzophenone (a benzophenone-based ultraviolet absorbing agent was not added to the composition for forming first layer.

Comparative Example 2

A hard coat film was obtained in the same manner as in Comparative Example 1 except that the yellow decorative layer was formed in the same manner as in Example 2 replacing the red decorative layer.

Comparative Example 3

A hard coat film was obtained in the same manner as in Comparative Example 1 except that the blue decorative layer was formed in the same manner as in Example 3 replacing the red decorative layer.

Reference Example

A hard coat film was obtained in the same manner as in Comparative Example 1 except that the decorative layer was not formed.

[Light Transmittance]

Regarding the hard coat films obtained in Examples 1 to 3, Comparative Examples 1 to 3, and Reference Example, the transmittance of the first layer with respect to light having a wavelength of 380 nm and a light having a wavelength of 340 nm, and the transmittance of the second layer with respect to light having a wavelength of 380 nm and a light having a wavelength of 340 nm are respectively shown in Table 1. The transmittances of the first layer and the second layer were measured with the method described in the section "I. Hard coat film A. Hard coat film in first embodiment" above, using an ultraviolet visible spectrophotometer (V-7100 from JASCO Corporation).

Also, regarding the hard coat films obtained in Examples 1 to 3, Comparative Examples 1 to 3, and Reference Example, the transmittance of the primer layer as a whole including the first layer and the second layer with respect to light having a wavelength of 380 nm and with respect to light having a wavelength of 340 nm were respectively measured in the same manner. The results are shown in Table 1 below.

TABLE 1

|  | Light transmittance [%] | | Light transmittance [%] | | Light transmittance [%] Primer layer as a whole | |
|---|---|---|---|---|---|---|
|  | First layer | | Second layer | | | |
|  | 340 nm | 380 nm | 340 nm | 380 nm | 340 nm | 380 nm |
| Reference Example | 79.2 | 85.3 | 0.05 | 47.2 | 0.03 | 45.2 |
| Example 1 | 7.5 | 18.5 | 0.05 | 47.2 | 0.02 | 6.5 |
| Example 2 | 7.5 | 18.5 | 0.05 | 47.2 | 0.02 | 6.5 |
| Example 3 | 7.5 | 18.5 | 0.05 | 47.2 | 0.02 | 6.5 |
| Comparative Example 1 | 79.2 | 85.3 | 0.05 | 47.2 | 0.03 | 45.2 |
| Comparative Example 2 | 79.2 | 85.3 | 0.05 | 47.2 | 0.03 | 45.2 |
| Comparative Example 3 | 79.2 | 85.3 | 0.05 | 47.2 | 0.03 | 45.2 |

Evaluation 1

The hard coat films obtained in Examples 1 to 3, Comparative Examples 1 to 3, and Reference Example were respectively transferred and attached to a transparent polycarbonate (PC) resin plate not containing a coloring agent, and thereby laminates (in first embodiment) are obtained. A xenon radiation test was respectively conducted to the obtained laminates using a xenon weather meter (7.5 kW super xenon weather meter SX75 from Suga Test Instruments Co., Ltd.) for 1000 hours in the condition of the repetition of the below condition (1) and condition (2), and thereby color difference LE was evaluated.

Condition 1

Irradiance: 180 W/m$^2$
Black panel temperature (BPT): 65° C.
Humidity: 50%
Time: 102 minutes Condition 2

Irradiance: 180 W/m$^2$
Black panel temperature (BPT): 28° C.
Humidity: 95%
Spray irradiation: present
Time: 18 minutes The color difference ΔE was calculated according to JIS Z8730: 2009, regarding the laminates before and after the irradiation test, brightness L*, chromaticity a* value, and chromaticity b* value were respectively measured from the hard coat layer side using a spectral colorimeter (SD5000 from NIPPON DENSHOKU INDUSTRIES CO., LTD.) and D65 light source, the calculation was done from L*, a* value, and b* value before the test and L*, a* value, and b* value after the test.

Also, the scratch resistance of the obtained laminates was respectively evaluated. The scratch resistance was evaluated based on ASTM D1044-08e1, and a Tabor abrasion test was conducted to the surface of the hard coat layer side in the conditions of the abrasion ring of CS-10F, the load of 500 g, and the rotation number of 500 rotations. Haze difference (LH) of the laminates before and after the abrasion test were measured using a haze meter (product name: Haze Guard Plus from Toyo Seiki Seisaku-sho, Ltd), and ΔH<10 was evaluated as "0".

The results of each evaluation are shown in Table 2 below.

TABLE 2

|  | ΔE | Scratch resistance |
|---|---|---|
| Reference Example | 0.5 | ○ |
| Example 1 | 2.3 | ○ |
| Example 2 | 1.8 | ○ |
| Example 3 | 2.0 | ○ |
| Comparative Example 1 | 4.8 | ○ |
| Comparative Example 2 | 5.3 | ○ |
| Comparative Example 3 | 5.2 | ○ |

From Table 2, ΔE of the laminates in which the hard coat film obtained in Examples 1 to 3 were attached was respectively lower than ΔE of the corresponding laminates in which the hard coat film obtained in Comparative Examples 1 to 3 were attached. From this result, it was shown that the photodegradation of the decorative layer was inhibited in the laminate in which the hard coat film obtained in Examples 1 to 3 were respectively attached to a transparent PC resin plate.

Example 4

A hard coat film (in third embodiment) was obtained in the same manner as in Example 1, except that the decorative layer was not formed.

Comparative Example 4

A hard coat film (in third embodiment) was obtained in the same manner as in Comparative Example 1, except that the decorative layer was not formed.

Evaluation 2

The hard coat films obtained in Example 4 and Comparative Example 4 were respectively transferred to a smoke polycarbonate (PC) resin plate A containing a phthalocyanine-based coloring agent to obtain laminates (in second embodiment). Also, the hard coat films obtained in Example 4 and Comparative Example 4 were respectively transferred to a smoke polycarbonate (PC) resin plate B containing carbon black to obtain laminates (in second embodiment). The color difference ΔE and scratch resistance of the laminates were evaluated in the same manner as in Evaluation 1 regarding the obtained laminates after the irradiation using a xenon weather meter. The results are shown in Table 3 below.

TABLE 3

|  | Resin base | ΔE | Scratch resistance |
|---|---|---|---|
| Example 4 | Smoke PC resin plate A | 0.2 | ○ |
|  | Smoke PC resin plate B | 1.8 | ○ |
| Comparative Example 4 | Smoke PC resin plate A | 1.9 | ○ |
|  | Smoke PC resin plate B | 2.5 | ○ |

From Table 3, since LE of the hard coat film obtained in Example 4 was small, it was shown that the photodegradation of the smoke PC resin plate A and smoke PC resin plate B was inhibited by attaching the hard coat film in Example 4.

REFERENCE SIGNS LIST

1 . . . hard coat layer
2 . . . primer layer
3 . . . decorative layer
4 . . . substrate layer
5 . . . adhesive layer
10 . . . hard coat film
11 . . . first layer
12 . . . second layer
20 . . . laminate
21 . . . resin base
21A . . . transparent resin base
21B . . . coloring resin base
13 . . . color bar group
14 . . . light shielding part
15 . . . color bar holding frame
16 . . . color bar
20 . . . transmission type color chart for color calibration (color chart)
100 . . . color calibration viewer

The invention claimed is:

1. A hard coat film comprising:
a hard coat layer and a primer layer; wherein
the primer layer includes a first layer of which transmittance with respect to light having a wavelength of 380 nm is 30% or below, and a second layer of which transmittance with respect to light having a wavelength of 340 nm is 10% or below;
the first layer and the second layer are layered, in no particular order, in the position of one surface of the hard coat layer;
the hard coat film comprises a substrate layer in the position of the surface of the hard coat layer which is opposite side surface to the primer layer side surface;
the hard coat film comprises an adhesive layer in the position of the surface of the primer layer which is opposite side surface to the hard coat layer side surface, wherein the adhesive layer has heat sealing properties; and
the hard coat layer side surface of the substrate layer is subjected to a mold release treatment, or a mold release layer is arranged thereon.

2. The hard coat film according to claim 1, wherein, in the primer layer, the second layer and the first layer are layered in this order from the hard coat layer side.

3. The hard coat film according to claim 1, wherein the first layer contains an ultraviolet absorbing agent containing a benzophenone skeleton.

4. The hard coat film according to claim 1, comprising: the substrate layer in the position of the surface of the primer layer which is opposite side surface to the hard coat layer side surface; and an adhesive layer in the position of the surface of the substrate layer which is opposite side surface to the primer layer side surface.

5. A laminate comprising:
a coloring resin base, a primer layer, and a hard coat layer in this order; wherein
the primer layer includes a first layer of which transmittance with respect to light having a wavelength of 380 nm is 30% or below, and a second layer of which transmittance with respect to light having a wavelength of 340 nm is 10% or below; and
the first layer and the second layer are layered, in no particular order, between the hard coat layer and the coloring resin base.

6. The laminate according to claim 5, wherein, in the primer layer, the second layer and the first layer are layered in this order from the hard coat layer side.

7. The laminate according to claim 5, wherein the first layer contains an ultraviolet absorbing agent containing a benzophenone skeleton.

8. The laminate according to claim 5, comprising an adhesive layer between the primer layer and the coloring resin base.

9. The laminate according to claim 8, further comprising a substrate layer between the adhesive layer and the primer layer.

10. A hard coat film comprising:
a hard coat layer, a primer layer, and a decorative layer in this order; wherein
the primer layer includes a first layer of which transmittance with respect to light having a wavelength of 380 nm is 30% or below, and a second layer of which transmittance with respect to light having a wavelength of 340 nm is 10% or below; and
the first layer and the second layer are layered, in no particular order, between the hard coat layer and the decorative layer; and
a substrate layer is included in the position of the surface of the hard coat layer which is opposite side surface to the primer layer side surface, or in the position of the surface of the decorative layer which is opposite side surface to the primer layer side surface.

11. The hard coat film according to claim 10, wherein, in the primer layer, the second layer and the first layer are layered in this order from the hard coat layer side.

12. The hard coat film according to claim 10, wherein the first layer contains an ultraviolet absorbing agent containing a benzophenone skeleton.

13. The hard coat film according to claim 10, comprising: the substrate layer in the position of the surface of the hard coat layer which is opposite side surface to the primer layer side surface; and an adhesive layer in the position of the surface of the decorative layer which is opposite side surface to the primer layer side surface; wherein the adhesive layer has heat sealing properties.

14. The hard coat film according to claim 10, comprising: the substrate layer in the position of the surface of the decorative layer which is opposite side surface to the primer layer side surface; and an adhesive layer in the position of the surface of the substrate layer which is opposite side surface to the decorative layer side surface.

15. A laminate comprising:
a resin base, a decorative layer, a primer layer, and a hard coat layer in this order; wherein
the primer layer includes a first layer of which transmittance with respect to light having a wavelength of 380 nm is 30% or below, and a second layer of which transmittance with respect to light having a wavelength of 340 nm is 10% or below; and
the first layer and the second layer are layered, in no particular order, between the hard coat layer and the decorative layer.

16. The laminate according to claim 15 wherein, in the primer layer, the second layer and the first layer are layered in this order from the hard coat layer side.

17. The laminate according to claim 15 wherein the first layer contains an ultraviolet absorbing agent containing a benzophenone skeleton.

18. The laminate according to claim 15, comprising an adhesive layer between the decorative layer and the resin base.

19. The laminate according to claim 18, further comprising a substrate layer between the decorative layer and the adhesive layer.

* * * * *